United States Patent [19]

Degani et al.

[11] Patent Number: 5,037,476

[45] Date of Patent: Aug. 6, 1991

[54] PROCESS FOR IMPROVING PHOTOSTABILITY OF TITANIUM DIOXIDE PIGMENTS IN BINDER COMPOSITIONS WITHOUT DECREASING REFLECTIVITY

[75] Inventors: Yinon Degani, Highland Park; Adam Heller, Bridgewater, both of N.J.

[73] Assignee: AT&T Bell Laboratories, Murray Hill, N.J.

[21] Appl. No.: 617,465

[22] Filed: Nov. 19, 1990

Related U.S. Application Data

[63] Continuation of Ser. No. 351,311, May 4, 1989, abandoned, which is a continuation of Ser. No. 5,229, Jan. 20, 1987, abandoned.

[51] Int. Cl.$^5$ ................................. C09C 1/36
[52] U.S. Cl. ..................... 106/437; 106/436; 106/499
[58] Field of Search ............. 106/436, 437; 423/610, 423/611, 612, 613, 614

[56] References Cited

U.S. PATENT DOCUMENTS

| | | | |
|---|---|---|---|
| 2,346,085 | 4/1944 | Sawyer | 106/437 |
| 3,208,866 | 9/1965 | Lewis et al. | 106/437 |
| 3,937,797 | 2/1976 | Romanski et al. | 106/300 |
| 4,310,483 | 1/1982 | Dorfel et al. | 106/308 M |
| 4,388,435 | 6/1983 | Loch | 106/308 M |

FOREIGN PATENT DOCUMENTS

| | | | |
|---|---|---|---|
| 57-123824 | 8/1982 | Japan | 106/437 |
| 702867 | 1/1954 | United Kingdom | 106/437 |
| 2035978 | 6/1980 | United Kingdom | 106/437 |

Primary Examiner—William R. Dixon, Jr.
Assistant Examiner—Scott L. Hertzog
Attorney, Agent, or Firm—B. S. Schneider

[57] ABSTRACT

Paints and coatings involving semiconducting pigments such as titanium dioxide generally degrade because of oxidation of the binder by reactants that are photochemically produced on the pigment surface, and because of direct binder oxidation by charges that are photogenerated in the pigment. In titanium dioxide, this interaction is substantially reduced by avoiding reduced species and by introducing into the titanium dioxide trap states where photogenerated electron-hole pairs recombine by processes such as prolonged milling. Through these expedients, a substantial increase in the stability of the pigment containing composition is obtained.

2 Claims, 1 Drawing Sheet

PROCESS FOR IMPROVING PHOTOSTABILITY OF TITANIUM DIOXIDE PIGMENTS IN BINDER COMPOSITIONS WITHOUT DECREASING REFLECTIVITY

This application is a continuation of application Ser. No. 07/351,311, filed on May 4, 1989, now abandoned, which is a continuation of application Ser. No. 005,229, filed 1/20/87 (now abandoned).

BACKGROUND OF THE INVENTION

1. Technical Field

This invention relates to pigment compositions and in particular pigment compositions including titanium dioxide.

2. Art Background

Titanium dioxide is a pigment that is extensively utilized in a variety of applications. Generally the pigment is combined with a binder such as a latex, acrylic, vinyl acetate, alkyd, polyester, polystyrene, poly(methylmethacrylate) (PMMA), polyvinylchloride (PVC), melamine, cellulose and/or cellulose derivative in an emulsion or dispersion that is employed to produce a final product e.g., a painted board, colored plastic, or paper. For example, titanium dioxide is utilized as the pigment in white paint, in interior and exterior house paint, automotive paints and coatings. Titanium dioxide was first commercially produced by extracting titanium ore, such as Ilmenite ($FeTiO_3$), with concentrated sulfuric acid to form a liquid sulfate solution, concentrating this solution, by evaporating water, separating the $FeSO_4$ precipitate, hydrolyzing the solution to precipitate hydrated titanium dioxide, and baking at 800° to 1000° C. to form a cake. The resulting cake of agglomerated material is then mechanically treated to disaggregate agglomerates to smaller particles that are suitable for use. Although the titanium dioxide obtained by this procedure was employed for a substantial time, it had significant associated problems. These problems were generally correlated with relative broad particle size distribution and with the presence of impurities, particularly iron, that remained in the titanium dioxide during production. Generally, these impurities were homogeneously distributed in the titanium dioxide particles. Strong efforts were made to reduce the iron content and commercial limits of no more than 200 ppm by weight were established. (See H. Rechmann, *Berichte Der Bunsengesellschaft fur Physikalische Chemie*, 71, 277-285 (1967).) The impurities cause, because of their strong light absorption in part of the visible spectrum, a significant decrease in the reflectivity of the particles and, in turn, a substantial deviation from "white" color. Thus, great effort was focused on eliminating these impurities. The broad particle size distribution also reduces the pigments efficacy to scatter visible light. Particles of 0.2–0.3 μm diameter are most efficient for scattering in the visible.

To alleviate these problems, a procedure was developed to produce a more uniform, purer titanium dioxide. This method described in Kirk-Othmer, *Encyclopedia of Chemical Technology*, 3rd edition, Vol. 23, pages 143-149, in U.S. Pat. No. 2,833,627, 4,462,979, and in other patents mentioned in this latter patent (which are all hereby incorporated by reference), involves reaction of titanium tetrachloride with oxygen in a 1500° C. flame to produce a particulate soot. The resulting titanium dioxide is not only substantially purer, but also is formed in uniform, appropriately sized particles, i.e., particles in the range 0.18 μm to 0.26 μm. Since appropriately sized particles are directly obtained, mechanical processing and its concomitant costs are eliminated.

Although this improved procedure for producing titanium dioxide yields substantially improved purity, binder degradation due to exposure to sunlight still occurs. To improve performance, the titanium dioxide is coated with a passivating, dielectric layer, e.g., silicon dioxide or aluminum oxide. (Generally a material with a resistance to electron or hole transport above $10^4$ ohms is desired.) The coating, it is believed, prevents photogenerated electrons and holes in the titanium dioxide from directly or indirectly reacting with the binder. Although stability is enhanced through this coating procedure, the enhanced stability is purchased at the expense of 1) the increased cost associated with the coating process, and 2) decreased reflectivity associated with the coating material. Nevertheless, the stability of such material is quite acceptable and it is presently being extensively utilized in commercial products.

SUMMARY OF THE INVENTION

It has been found that for titanium dioxide, such as titanium dioxide that does not require deagglomeration of aggregated particles, e.g., high purity titanium dioxide produced by the soot, i.e., chloride process, a reduced photochemical activity is attainable even if the titanium dioxide is not coated. This stability in the absence of coating is achieved by annihilating the photogenerated charges in the titanium dioxide before they chemically react with species adsorbed on the pigment particles. This result is achieved by 1) the introduction of electron and hole traps into the lattice or onto the surface of the titanium dioxide particles beyond those already present after the synthesis of the titanium dioxide, and/or, by 2) the suppression of reduced entities such as $Ti^{3+}$. Surprisingly, even though submicron particles undoubtedly have traps associated with their high surface to mass ratio, a further increase in trap concentrations produces an unexpectedly large increase in stability. Several methods exist for effecting these goals. Acceptable methods include extended grinding, milling or crushing, i.e., fracturing the crystal structure for periods of at least a day, and/or high temperature treatment in an oxidizing medium, e.g., air or oxygen. For some applications the latter method is more desirable since it does not decrease the particle size of the treated titanium dioxide. In all cases however, pigment composition stability is maintained while the costs associated with coating are eliminated.

DETAILED DESCRIPTION

Figure 1:
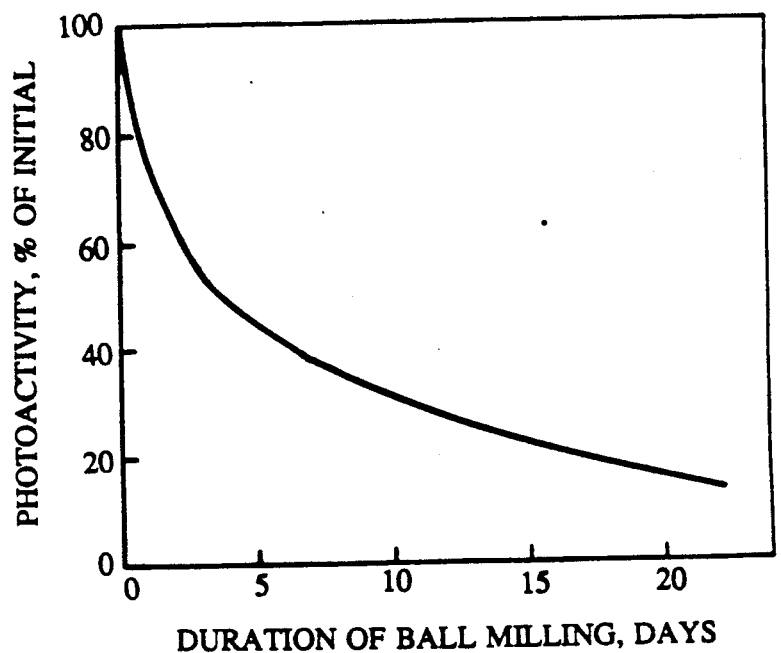
FIG. 1 illustrates results achieved with the invention and FIGS. 2–4 illustrate processes associated with the invention.

The invention involves titanium dioxide utilized as a pigment in a composition where the interaction of this pigment with a binder, e.g., with latex, acrylics, vinyl acetates, alkyds, polyesters, polystyrenes, PMMA, PVC, melamines, cellulose, and cellulose derivatives is possible. (A binder for purposes of this invention is an organic polymer, polymer containing material, or polymer precursor in which the pigment is dispersed or suspended.) Thus, the invention pertains to a pigment composition containing both titanium dioxide, e.g., high purity titanium dioxide, and a binder. (For purposes of this invention, titanium dioxide includes its rutile and anatase forms.) In such composition, it is typically desirable to utilize titanium dioxide having a particle size in the range 0.1 to 1.0 μm. Particles larger than 1 μm and particles smaller than 0.1 μm are not desirable because they are less efficient light scatterers per unit weight. (Although particles outside this size range are not advantageous, they are not precluded.) As previously discussed, through the interaction of titanium tetrachloride and oxygen, particles of desirable size are easily produced.

To obtain increased stability, interaction of charges (holes and electrons) and reduced entities such as $Ti^{3+}$ with adsorbed entities, e.g., 1) entities that react with holes such as water and most significantly adsorbed organic material, and 2) entities that react with electrons such as oxygen, should be suppressed. This suppression is attainable by reacting holes with electrons, to annihilate both, before they react with adsorbed entities at the particle surface, such as by avoiding reduced species, e.g., $Ti^{3+}$, $Ti^{2+}$, and oxygen lattice vacancies that strongly interact with surface adsorbed water and other reactants and that also, even more significantly, for reasons discussed below, prevent electron-hole annihilation. Electrons and holes are reacted in an advantageous manner by providing traps for each. Generally, it is desirable to produce electron and hole traps, i.e., recombination sites, at a surface concentration of at least $10^{12}/cm^2$, preferably $4 \times 10^{12}$ or a bulk concentration of $10^{17}/cm^3$. The stability of the material increases substantially with the number of traps. However, at surface concentrations greater than $3 \times 10^{14}/cm^2$ or bulk concentrations of $3 \times 10^{19}/cm^3$, it appears that further significant improvement is not obtained and color changes are observed. One method for introducing the desired concentration of traps is through mechanical stress, i.e., by methods such as milling, grinding and crushing where agglomerates are not merely dispersed, but where at least 10% of the individual, submicron sized pigment particles are fractured by the stress. For example, traps for both electrons and holes are produced at a sufficient concentration by ball milling titanium dioxide particles in a plastic jar for at least a day, preferably for 21 days. Although the milling procedure produces the desired concentration of traps, it also reduces the particle size. For example, grinding for 21 days reduces particle size from 0.2 μm to 0.1 μm. If particle size reduction is not acceptable in a particular application, other methods are available for introducing traps i.e., for inducing electron-hole annihilation.

Figure 2:
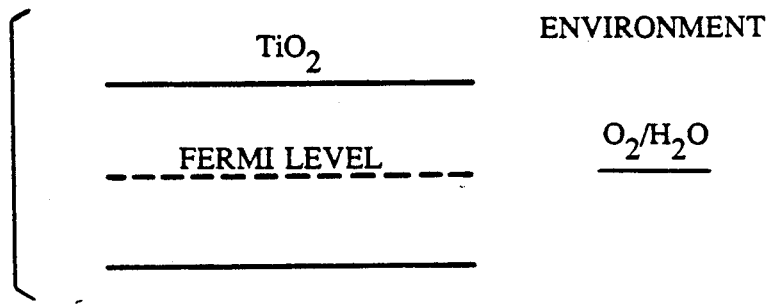
Figure 3:
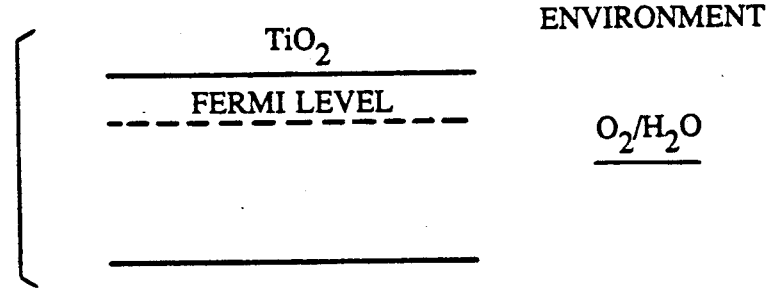
Figure 4:
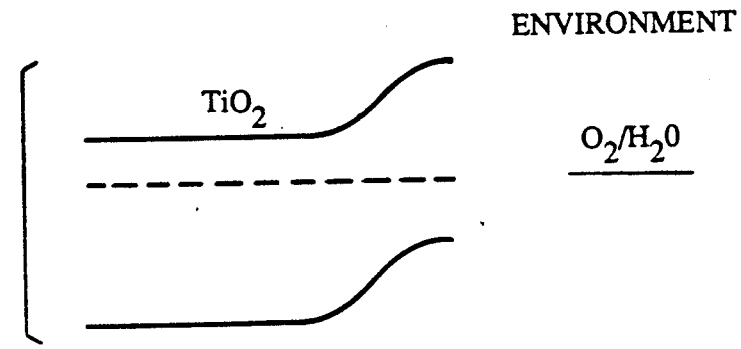

In particular, it is possible to induce annihilation of holes and electrons by limiting the presence of reduced entities such as $Ti^{3+}$, $Ti^{2+}$ and oxygen lattice vacancies. A contemplated explanation for this phenomenon is based on the alignment of the Fermi level in the $TiO_2$ with the electrochemical potential of the environment. As illustrated in FIG. 2, the Fermi level in intrinsic $TiO_2$ ($TiO_2$ with no reduced species) is approximately at the same electrochemical potential as the typical environment of $O_2/H_2O$. Thus band bending at the $TiO_2$/environment interface does not occur. The presence of reduced entities in the $TiO_2$ produces a Fermi level as shown in FIG. 3. Thus, at the interface between the $O_2/H_2O$ environment and the $TiO_2$ equalization of the Fermi level and the electrochemical potential of the environment, produces band bending as shown in FIG. 4. Since no band bending occurs with intrinsic $TiO_2$, electrons have no barrier to reaching the $TiO_2$/environment interface and no barrier to their annihilation of holes at the interface. In contrast, the $TiO_2$ with reduced species, as shown in FIG. 4, presents a substantial barrier to electrons and prevents their reaching the $TiO_2$/environment interface. This barrier for electrons, in contrast, promotes the migration of holes to the interface. Thus, holes are preferentially directed to the interface and annihilation of these holes, e.g., photogenerated holes that induce degradation, is undesirably limited.

Production of dopant sites is another possible means for attaining the desired trap concentration. However, the dopant should not induce band bending as shown in FIG. 4. For example, iron, manganese or cobalt doping used in $TiO_2$ in a reducing environment, e.g., an aqueous solution containing methylviologen cations and methylviologen radical cations shows good stability. However, the effect of dopants in an environment with a lower electrochemical potential, e.g., an oxidizing environment, is not clear.

The heating of titanium dioxide in an oxygen environment at a temperature of at least 350° C., preferably at least 550° C., also limits the reaction of charges with species such as water and adsorbed organic material. This heat treatment ensures that essentially all the Ti, including that on the surface, is fully oxidized to $Ti^{4+}$, thus limiting adsorption of water and other adsorbates on the surface and even more importantly ensuring electron hole annihilation. Subsequent heating in a reducing environment, e.g., hydrogen, produced the opposite effect and thus limits electron hole annihilation. Similarly, if heating to 550° C. occurs in an inert environment such as in nitrogen, and in the presence of an organic adsorbate, reduced species, such as $Ti^{3+}$ are formed. The same effect is seen in an inert atmosphere, but in the absence of an organic adsorbate, at temperatures exceeding 800° C. It is also seen at such temperatures in an air or oxygen environment, but only if the subsequent cooling is sufficiently rapid to prevent curing of oxygen vacancies, e.g., the pigment is quenched in a cold fluid. Thus, if heating of the pigment occurs in an oxidizing atmosphere, at 350° to 800° C. paint photostability is enhanced, while if it occurs in an inert environment in the presence of a reducing agent, or at extremely elevated temperatures, instability is promoted.

Although expedient means for annihilation of electron and holes has been disclosed, enhanced stability is not dependent on the method utilized to produce this effect. As long as a sufficient number of effective traps or annihilation means are introduced into the pigment, a corresponding enhancement of stability is obtained. For example, if $Ti^{3+}$ and other reduced species are substantially eliminated, stability is enhanced because annihilation is promoted. The following examples are illustrative of 1) advantageous methods of eliminating destructive photogenerated charges, 2) the results achieved by this elimination, and 3) results achieved by reducing the adsorption of species that react with these charges, e.g., by assuring that all the Ti on the surface and in the bulk is fully oxidized to $Ti^{4+}$ and is coordinated with oxygen.

EXAMPLE 1

Titanium dioxide particles in their rutile form were obtained from E. I. duPont de Nemours & Co., Inc. as Dupont R-101 pigment. This pigment had an average particle size diameter of 0.2 μm, had a narrow particle size distribution, and had a coating of triethanolamine which constituted 1% by weight of the particles. Experiments were performed both on the titanium dioxide as purchased and on titanium dioxide particles that were etched in a strong mineral acid. This mineral acid etch constituted immersion in 3M boiling sulfuric acid for 15 minutes. (Another batch of particles were etched in 3M boiling hydrochloric acid but the observed result did not depend on the acid utilized.) After cooling to room temperature, the mixture was filtered and washed five times with deionized water.

Treated particles and untreated particles in separate batches were ball-milled in a 500 ml polyethylene jar half filled with dense alumina cylinders measuring 6 mm in diameter and 6 mm in length. For each run the jar was filled with 100 g of titanium dioxide and 350 ml of deionized water. The jar was rolled at 120 RPM and samples of the resulting slurry were removed for testing after one day, two days, one week, two weeks, and three weeks of milling.

The resulting milled pigment was assayed for photoactivity by suspending a 150 mg sample of titanium dioxide in an aqueous solution that was $2.5 \times 10^{-3}$M in methylviologen (made of the dichloride) and $3 \times 10^{-2}$M in disodium EDTA. The suspension was buffered at pH 6.0 and kept under nitrogen. Photogenerated holes oxidize EDTA directly. Electrons reduce methylviologen to blue methylviologen radical that is assayed spectroscopically, by following the change of adsorption at 602 nm. The change in absorption is directly proportional to the rate of the photochemical reaction. The light source utilized for treatment of the composition was a 250 W Xe/Hg arc lamp. The output of this lamp was filtered utilizing a Corning 7-51 and 0-51 filter to confine the active radiation to a wavelength of $360 < \lambda < 400$ nm.

The size of the pigment particles obtained for various lengths of treatment were measured utilizing the Brunauer, Emmett and Teller (BET) gas adsorption/-desorption method. Through this measurement, a decrease in the average particle size from 0.2 μm to 0.1 μm was observed after 21 days milling. The decrease in photoactivity as a function of milling time is shown in the Figure. As can be seen, the photoactivity decreased to 9% of its initial value. Heating the milled sample in air to 550° C. for two hours further decreased the photoactivity to 6% of the initial value, while heating it under nitrogen at 550° C. for two hours increased the photoactivity from 9% to 15% of the initial value, but only if there is an organic adsorbate such as triethanolamine or cyclohexanone on the particles.

EXAMPLE 2

Both treated and untreated pigments were placed in separate quartz boats and heated in a slow stream of air or of nitrogen to 550° C. for two hours. The samples were either allowed to cool at a rate of 1° C. per minute to ambient temperature or were quenched in liquid nitrogen. The photoactivity change was measured as described in Example 1. The pigment having the triethanolamine adsorbate (whether slowly cooled or rapidly quenched) when heated under nitrogen exhibited a two-fold increase in photoactivity. Heating of either the treated or untreated pigment in air followed by either slow cooling or rapid quenching causes a six-to-seven-fold decrease in photoactivity, to 15% of the initial value. Heating of the air treated pigment under nitrogen does not increase its photoactivity. Additionally, etching the air treated pigment in boiling mineral acid also does not increase photoactivity.

EXAMPLE 3

The pigment described in Example 1 was treated by boiling for 15 minutes in 3M hydrochloric acid. The photoactivity of the pigment was measured as described in Example 1 and exhibited a six-fold increase. If the acid treated pigment is subsequently boiled in 3M tetramethylammonium hydroxide, the photoactivity remains unchanged. BET measurements indicate that the acid treatment neither increases nor decreases the surface area of the pigment.

EXAMPLE 4

The pigment, as received from the manufacturer and as described in Example 1, was heated to 550° C. for 2 hours in air. The photochemical activity of this pigment in air was then determined through assaying the amount of hydrogen peroxide formed. In the test, the pigment was suspended in a solution containing 90% by volume of water, 10% by volume isopropyl alcohol, and 0.1 m of sodium acetate/acetic acid buffer. The pH of the solution was 5.1. To 15 ml of this solution, 2 grams of the pigment were added. The mixture was illuminated by a 100 W medium pressure mercury lamp ($\lambda_{max}=336$ nm). The concentration of hydrogen peroxide in the mixture was assayed, following different periods of illumination from 0 to 20 minutes. The assay was done by withdrawing 2.5 ml samples, filtering them through a 0.45 micron filter, adding to the samples 1 ml solutions containing acetate buffer (0.1M, pH 5.1) and o-dianisidine (0.3 mM). Subsequently, 100 μl of a solution of the enzyme horseradish peroxidase (60 units per ml) were added. The adsorption of the solution, at $\lambda=500$ nm, which is proportional to the concentration of the hydrogen peroxide, was then measured. Comparison of the unmodified pigments (as received from the manufacturer) and the pigment heated in air at 550° C. for 2 hours showed that the pigment heated in air had one fifth of the photochemical activity of the manufacturer's pigment.

EXAMPLE 5

The pigment heated in air, as in Example 4, was subsequently heated in forming gas (96% nitrogen, 4% hydrogen) for 2 hours at 550° C. The pigment, after heating, was slightly blue in color. The photochemical activity of the pigment in a normal (air) atmosphere was assayed as in Example 4. The activity increased with respect to the oxidized pigment by a factor of 20 (i.e., by a factor of 4 with respect to the pigment received from the manufacturer).

EXAMPLE 6

The triethanolamine coated pigment of Example 1, that was heated in nitrogen at 550° C. for 2 hours, was evaluated for its photochemical activity in air by the method used in Example 4. The photochemical activity of this pigment was 25 times higher than the activity of the original pigment received from the manufacturer.

What is claimed is:

1. A process for enhancing the photostability of, without substantially decreasing the reflectivity of, a composition comprising titanium dioxide and a binder, said binder comprising a material chosen from the group consisting of polymer containing materials and polymer precursors, wherein said process comprises grinding said titanium dioxide, to submicron particle size such that crystal structure of at least 10 percent of the submicron sized particles are fractured, and combining said titanium dioxide and said binder.

2. The process of claim 1 wherein said composition contains sufficient titanium dioxide so that said composition is suitable as a paint.

* * * * *